United States Patent [19]
Valentine

[11] 3,869,811

[45] Mar. 11, 1975

[54] EDUCATIONAL DEVICE FOR LEARNING THE OSCILLOSCOPE

[75] Inventor: Charles G. Valentine, Stamford, Conn.

[73] Assignee: Xerox Corporation, Stamford, Conn.

[22] Filed: Mar. 30, 1973

[21] Appl. No.: 346,509

[52] U.S. Cl. .................................. 35/19 A, 35/13
[51] Int. Cl. ........................................ G09b 23/18
[58] Field of Search ............. 35/8 R, 8 A, 9 R, 9 A, 35/9 E, 10, 13, 19 R, 19 A, 28, 48 R; 40/142 A

[56] References Cited
UNITED STATES PATENTS

| | | | |
|---|---|---|---|
| 3,077,696 | 2/1963 | Barnett et al. .................. | 35/19 A X |
| 3,205,407 | 9/1965 | Thompson ......................... | 317/101 |
| 3,245,156 | 4/1966 | DeBloois et al. .................... | 35/8 A |
| 3,423,846 | 1/1969 | Arend ................................ | 35/19 A |
| 3,520,074 | 7/1970 | Severin et al. ...................... | 35/48 R |
| 3,651,592 | 3/1972 | McCormick ....................... | 40/142 A |
| 3,656,242 | 4/1972 | Atkinson............................. | 35/19 A |

FOREIGN PATENTS OR APPLICATIONS

1,091,357  6/1966  Great Britain ................... 40/142 A

Primary Examiner—Robert W. Michell
Assistant Examiner—Vance Y. Hum

[57] ABSTRACT

An educational kit for teaching the basic principles involved in the functioning of an oscilloscope is disclosed. The kit comprises instructional means, a simulator board having printed thereon graphic indicia including a schematic sectional view of a cathode-ray tube as found in an oscilloscope and means on the board adapted to connect an oscilloscope to the simulator board, and a plurality of manipulative pieces, said pieces being adapted for placement on said simulator board.

7 Claims, 21 Drawing Figures

AUDIO VISUAL MEANS

*FIG. 7*

WORK SHEETS

EDUCATIONAL DEVICE FOR LEARNING THE OSCILLOSCOPE

BACKGROUND OF THE DISCLOSURE

I. Field of the Invention

This invention relates to an educational device, and more particularly to an educational kit primarily for demonstrating, illustrating, testing and instructing the basic principles involved in the functioning of an oscilloscope.

II. Description of the Prior Art

A problem of increasing difficulty in the education field is that of providing relatively simple means for instructing students in a particular technology. This problem is particularly acute in community colleges, vocational high schools, trade schools, corporations which offer on-the-job training, in military service training schools, and other special schools where various types of technologies, such as for example, mechanical and electrical technologies, are sought to be taught on a simplified basis. This problem has been accentuated by the large number of new technological fields that have been developed over the past several years, and also by the large number of students seeking to gain knowledge of these fields. These developments, coupled with the high cost and complexity of the various educational devices used in schools to teach these technologies have given rise to a tremendous demand for simple, relatively inexpensive, rugged, easily assembled, relatively portable and easily understood educational devices to teach these technologies.

Furthermore, at some point during the learning process, it is desirable that the student extend beyond textbooks, manuals or diagrams and be afforded the opportunity to see, examine, and manipulate the system under study. Physical manipulation of the system aids the student in better understanding what he hears or reads about and therefore complements the entire learning process.

Recent years have marked the introduction of a large number of educational teaching devices aimed at instructing students in various technologies. The most common of these devices are the mechanical or computer devices designed to be used by individual students. The theory behind the increasing use of such devices is that account is made of the individual differences in ability, speed and grasp of subject matter, thereby permitting the student to learn at his own pace and with minimum supervision by the teacher. Some of these devices, such as the video computer type devices, are designed to take over a substantial part of the responsibility for providing and transmitting basic information. Others are designed simply to supplement the teacher's own instructional materials by introducing new dimensions into the learning process whereby, for example, spelling may be associated with pictures of objects, mathematical concepts associated with relative sizes and shapes of objects, or correct responses to questions posed by a computer type device rewarded by permission to proceed. Although numerous efforts have been made to construct simple, relatively inexpensive, rugged, easily assembled, relatively portable and easily understood educational devices, known devices, although satisfactory in some of these respects, do not possess these combined advantages when compared to the novel and advantageous educational kit of the present invention.

The advantages of a teaching method using a device geared for the individual whereby both the teacher and the individual may be appraised of the individual's progress are not restricted to the traditional elementary or high school subjects; occupational learning materials that take into account individual differences in ability, speed and grasp of subject matter also have a better chance of being effective. However, at the present time, there are very few effective educational devices available in the community colleges, the junior colleges, the vocational high schools, the trade schools and other special schools where various types of mechanical, electrical, medical or other occupational technologies are sought to be taught on a simplified and individualized basis. There is a great need for programmed instructional materials in the various areas of occupational technology such as for example, electronics, automotive technology, drafting, heating and air conditioning, and in the medical and chemical areas of technology, as well as in the traditional areas of high school study.

SUMMARY OF THE INVENTION

It is therefore an object of the present invention to overcome the disadvantages of the prior art educational devices and to provide an educational kit which is simpler, more durable, less expensive, more easily assembled and still more pleasing from a design viewpoint than prior art devices and otherwise more suitable for use in various types of learning institutions for understanding and acquiring a substantial amount of knowledge about an oscilloscope.

It is a further object of this invention to provide programmed educational kits which present information using a multimedia approach.

It is a further object of this invention to provide an educational kit which is compact when assembled.

It is a further object of this invention to provide an educational kit which is quickly disassembled for easy storage in a very small space.

It is a further object of this invention to provide an educational kit suitable for teaching students the fundamentals and theory behind an oscilloscope.

It is a further object of this invention to provide an educational kit that enables a student to operate an oscilloscope while learning about its function.

It is a further object of this invention to provide an educational kit which enables an instructor to play a more active role in student learning.

It is a further object of this invention to provide an educational kit which enables the student to learn using several forms of communication.

It is a further object of this invention to provide an educational kit which enables the student to participate in different kinds of learning experiences; i.e., the student listens to information while viewing a series of related visuals, such as photographs, drawings, written information, etc., and participates in a manipulative activity which gives the student a chance to try doing himself what he has been shown and told how to do.

It is a further object of this invention to provide an educational kit which provides means to test the student while he is learning.

It is still a further object of this invention to provide an educational kit which, in addition to its educational features and mechanical advantages, possesses a pleasing design.

The foregoing objects and others are accomplished in accordance with the present invention by providing an educational kit for teaching basic principles in the functioning of an oscilloscope comprising a simulator board having a surface of magnetically attractive material including graphic indicia defining a sectional view of a cathode-ray tube and means on the board adapted to connect an oscilloscope thereto; a plurality of magnetically attractive manipulative pieces bearing individually graphic indicia on their surfaces; and audiovisual instruction means; the manipulative pieces adapted for manipulation within the confines of the simulator board by the user in response to the instruction means such that control mechanisms which control the operation of a cathode-ray tube and circuits found within an oscilloscope effecting the control mechanisms can be graphically depicted, the magnetically attractive board, or alternatively each of the magnetically attractive pieces being magnetic to provide a mutual attraction between the pieces and the board.

The educational kit in accordance with the invention is designed to teach the basic fundamentals in the functioning of an oscilloscope using a programmed multimedia approach whereby the student hears and sees information, performs by answering questions, solves problems and manipulates objects. Each time a student learns something new, he responds to this new knowledge or skill to make sure he has learned it correctly. First, he performs an activity such as by answering a question, solving a problem or manipulating a device. Then he finds out immediately if the action is correct by comparing the result of his action with the one provided by the program. If the student finds that his answer is correct, this "instant feedback" motivates him to continue learning. If he discovers that his answer is wrong or inadequate, he can stop at that point and find out where his error is.

The educational kit is designed for individual use, use by small groups without the need for extensive supervision or participation by an instructor or use by groups with an instructor. It permits the student to learn at his own pace, and also affords him the chance to capitalize on the way he learns best because he participates in different kinds of learning experiences. He listens to information while viewing a series of related visuals and participates in manipulative activity which gives him a chance to try doing himself what he has been shown or told how to do. He is thus totally involved in the learning process.

BRIEF DESCRIPTION OF THE DRAWINGS

For a better understanding of the invention, as well as other objects and further features thereof, reference is made to the following detailed disclosure of this invention taken in conjunction with the accompanying drawings wherein.

DESCRIPTION OF THE PREFERRED EMBODIMENTS

Figure 1:
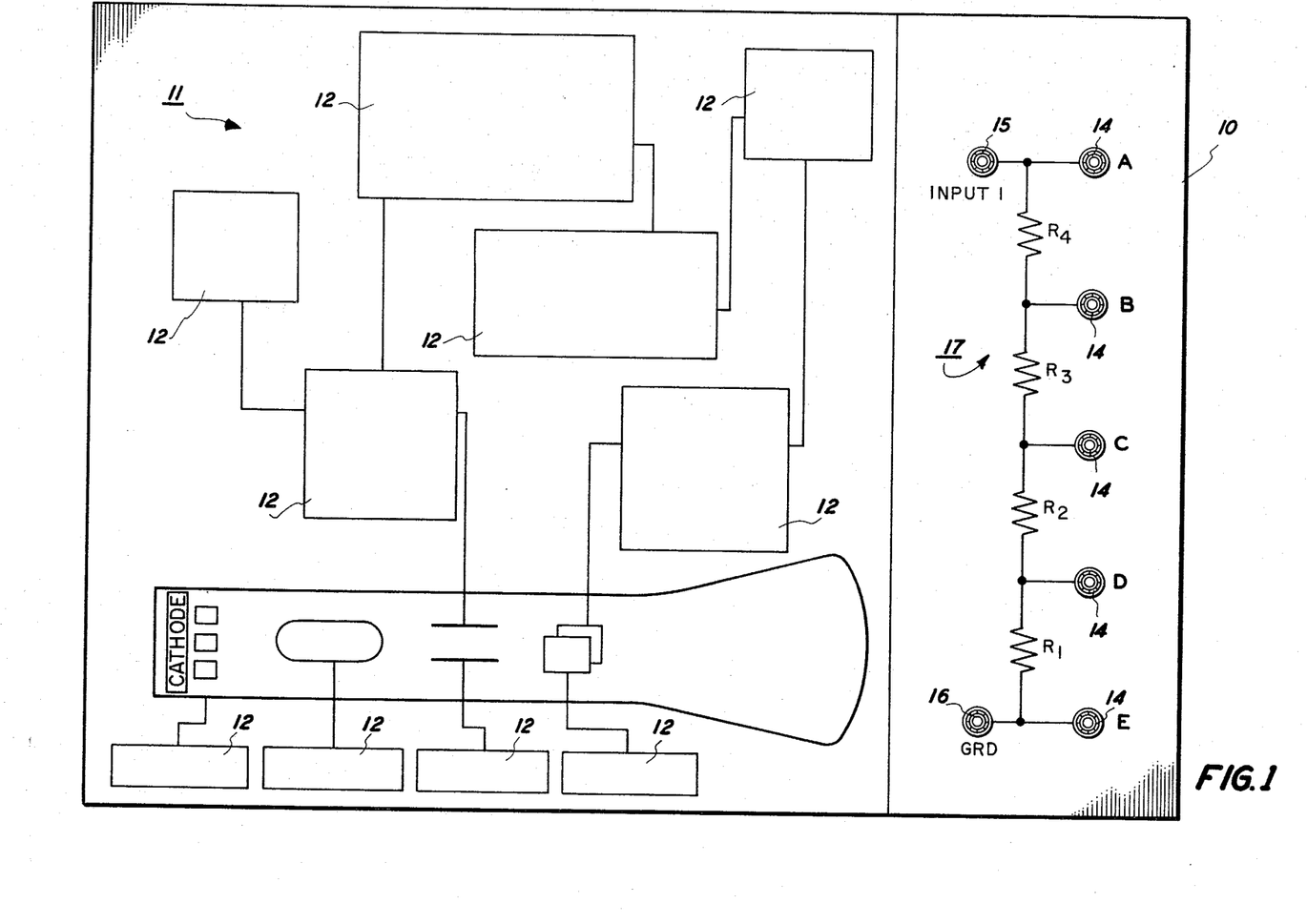
FIG. 1 is a plan view of a preferred simulator board in accordance with the invention.
Figure 4:
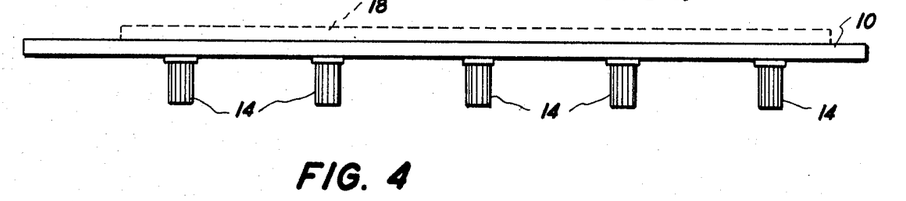
FIG. 4 is an elevational view of the simulator board shown in FIG. 1.

In FIGS. 1 and 4, there is shown a simulator board 10 which actively allows a student to actually use his hands as a learning tool as well as his eyes and ears. By performing various activities using the simulator board, its accessories, and various instruments such as an oscilloscope, a multimeter and a signal generator, the student takes an active part in the learning process and achieves an understanding of how an oscilloscope functions more quickly. The simulator board 10 is shown having printed thereon the left side of the board graphic indicia 11 representative of a schematic sectional view of a cathode-ray tube as found in an oscilloscope. This portion of the board also includes graphic indicia 12 representative of a plurality of blocked spaces or boxes with connecting lines which lead to various parts of the sectional view of the cathode-ray tube. It is within these spaces 12 that the student places various manipulative pieces as described herein below to identify various mechanisms within the cathode-ray tube, e.g., brightness, focus, horizontal adjusting voltage and vertical adjusting voltage, and also to be able to construct the circuits found within an oscilloscope which control these mechanisms, e.g., the circuits controlling the horizontal and vertical adjusting voltage.

On the right side of the board are a plurality of upstanding terminal posts 14 labeled A, B, C, D, and E, an input terminal post 15, and a ground terminal post 16. Graphic indicia 17 represents a voltage divider circuit including a plurality of resistors $R_1$, $R_2$, $R_3$ and $R_4$ connected in series. The voltage divider circuit illustrated on the front portion of the board as graphic indicia is actually constructed on the back portion of the board. This is shown in FIG. 4 as 18. Although any number of resistors each having any desired value of resistance can be used for this circuit, in one preferred embodiment of this invention, four resistors having values of 4.7 ohms ($R_1$), 6.8 ohms ($R_2$), 7.5 ohms ($R_3$) and 10.0 ohms are used for this circuit. This portion of the board provides the means to connect an oscilloscope to the board and thereby help a student understand how to operate an oscilloscope by connecting an oscilloscope to certain of the terminal posts and measuring voltages across various resistors in the manner as described herein below.

The simulator board 10 can be constructed by numerous methods. For example, the board can be constructed of a magnetically attractive sheet of ferris metal, such as for example, galvanized steel or a magnetic ferrite plastic, over which is painted a neutral background color, such as for example, a yellow or while enamel. The graphic indicia present on the board can then preferably be printed over the enamel background in a suitably contrasting color, such as for example, black. The printing may be accomplished by any suitable means, such as for example, a silk screening process. Although the simulator board may consist solely of a thin sheet of metal with suitably smooth edges, the magnetically attractive sheet is preferably laminated to a suitably backing member, such as Masonite, which imparts a desirable rigidity thereto and also allows the simulator board to be conveniently handled. Thus, in one preferred embodiment of this invention, the simulator board comprises a thin sheet of ferris metal having a thickness of about 1/32 inch laminated to a backing member made from a rigid material such as, fiber board, a resinous material, EPC, the backing member having a preferred thickness of about ¼ inch. The edges of the completed board can be covered with a plastic material to obtain a neat appearance and also to avoid the problem of having sharp edges. The simulator board can also be constructed of a magnetically attractive sheet of ferris metal such as galvanized steel which is secured to a sheet of a rigid polymeric material such as a vinyl material. In this embodiment, the graphic indicia is placed on the polymeric material as described above. The dimensions of the simulator board should be such that the board can be conveniently used by the student at a given workplace. Boards having dimensions of about 15 × 20 inches, or approximately 300 square inches, are particularly suitable.

To help the student understand the functioning of an oscilloscope, the student uses various manipulative pieces representing controls and control circuits found within an oscilloscope to identify these items within the oscilloscope, and also to set up and illustrate how these items operate a typical cathode-ray tube as outlined on the left-hand side of the simulator board 10. The preferred manipulative pieces used with the educational kit in accordance with the present invention are shown in FIG. 3 as FIGS. 3A–3N and 3P–3Q. Each of these pieces may consist of a relatively flat sheet of material, such as for example, a rigid polymeric material upon which is printed the indicia shown in FIGS. 3A–3N and 3P–3Q, and to the underside of which is secured a magnetically attractive material. Alternatively, the manipulative pieces can be constructed of a layer of a ferris metal, such as galvanized steel, a layer of a rigid polymeric material, such as a vinyl material upon which is printed the graphic indicia, and a magnetically attractive material secured to the metal layer. In a preferred embodiment, the manipulative pieces are made of a platic material, such as for example, polyvinyl chloride, having a thickness of about 1/16 inch with smaller sections of a magnetically attractive material laminated to the underside thereof. The smaller sections of magnetically attractive material not only serve to provide the means for securing the manipulative pieces to the simulator board, but also serve to provide a gap between the manipulative piece and the surface upon which it is resting to facilitate gripping and manipulation of the piece on flat surfaces.

Figure 2:
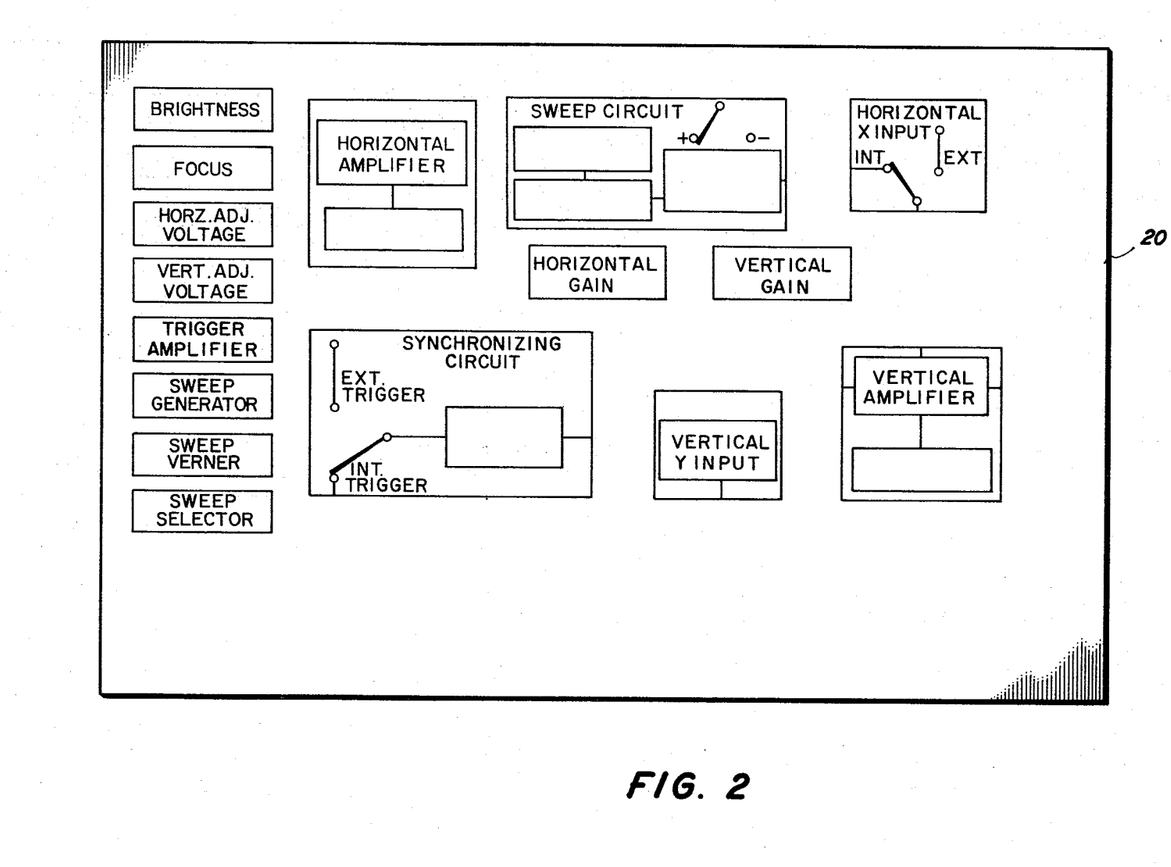
FIG. 2 is a plan view of a preferred embodiment of a display board.
Figure 3A:
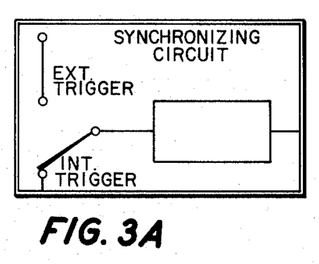
FIGS. 3A–3N and 3P–3Q are plan views of the preferred embodiments of the manipulative pieces in accordance with the invention.
Figure 3B:
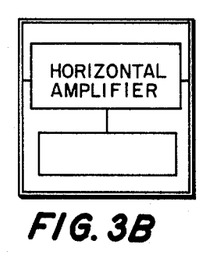
Figure 3C:
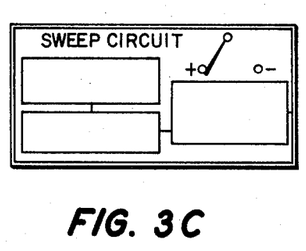
Figure 3D:
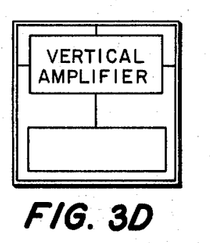
Figure 3E:
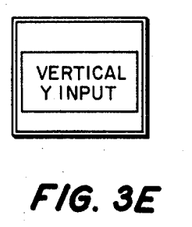
Figure 3F:
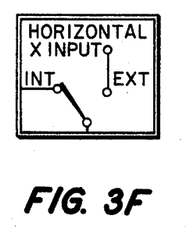
Figure 3G:
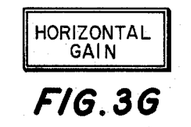
Figure 3H:
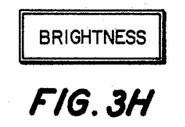
Figure 3I:
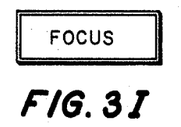
Figure 3J:
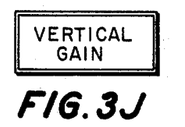
Figure 3K:
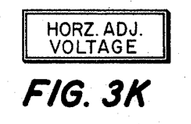
Figure 3L:
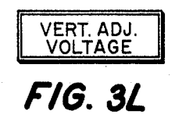
Figure 3M:
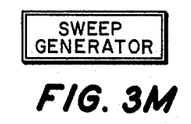
Figure 3N:
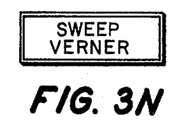
Figure 3P:
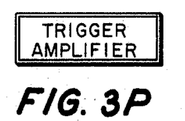
Figure 3Q:
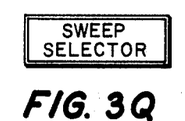

In accordance with a preferred embodiment of this invention there are various manipulative pieces as represented in FIGS. 3A–3N, 3P and 3Q which could be used with the simulator board 10 to learn about an oscilloscope. Although some of the manipulative pieces have specific items imprinted thereon, such as for example FIG. 3P which refers to a trigger amplifier, it is to be understood that it is within the scope of this invention to include as graphic indicia either the correct term for or a symbol of any item found in an oscilloscope. For purposes of illustrating the preferred embodiments of the present invention, manipulative pieces including one of each of the pieces shown in FIG. 3 could be used with simulator board 10 and display board 20 as shown in FIG. 2 to understand the functioning of an oscilloscope. The size and shape of these manipulative pieces is such that they fit and can be manipulated within the confines of the simulator board at the appropriate location.

In FIG. 2 there is shown display board 20 having printed thereon graphic indicia representative of the graphic indicia shown on each of the manipulative pieces. The purpose of the display board is to serve as a display and storage area for the magnetically attractive pieces which are used in conjunction with the simulator board. Each of the graphic indicia printed on the display board corresponds to the indicia printed on one of the manipulative pieces thereby facilitating systematic storage and display of the pieces and allowing for quick inspection to determine that all of the pieces are accounted for. The display board is also preferably constructed of a magnetically attractive material similar to the simulator board and the background may be printed thereon in the same or similar manner.

As indicated above, the surfaces of the simulator board 10, the display board 20 and at least the bottom portions of the manipulative pieces are made from or contain a magnetically attractive material. The term magnetically attractive material is intended to encompass material that is either itself magnetic or material that is attracted to a magnet. Thus, where the surface of the simulator board is magnetic, the bottom portions of the manipulative pieces need be only of a material that is attracted to a magnet. In a preferred embodiment of this invention, the bottom portions of the manipulative pieces have laminated thereto a section of a magnetic material such as a magnetic plastic or metal, and the simulator board and display board are made of a material that is attractive to a magnet, such as galvanized steel.

Various kinds of instructional means can be employed with the educational kit in accordance with the invention. For example, one of the preferred embodiments for instructional means is an audiovisual presentation using slides or film strips in conjunction with a descriptive audio account of the visuals, such as an audio cassette. The visual materials are synchronized with the audio presentation. The audiovisual portion makes it possible for a student to learn by listening to a description while seeing what is being described. A recorded narrator provides background information, describes equipment, or explains principals of operation while a series of illustrated visuals (photographs, graphs, drawings, written material, etc.) is shown to the student synchronized with the audio presentation. The narrator also tells the student, for example, how to proceed; whether to observe something that is being shown to him, to perform an activity on the simulator board 10, or to complete a question or problem on the student's worksheet; he suggests points at which the student might ask for help and, along with the visual portion provides answers to the questions presented on the work sheets or information about the simulator or equipment. The audiovisual presentation is stopped each time the narrator asks the student to do something. The student starts the sequence again after he completes the activity.

The audiovisual equipment needed, of course, will vary depending on the type of instructions to be given. A rear screen projector for small groups, or a projector and screen for a classroom presentation may be used. For the audio presentation either visual projection equipment with built-in audio capability or a separate cassette recorder may be used. The audio presentation may be on, for example, cassettes, and the visual portion on, for example, 35 mm film strip or slides.

In order to give the student an opportunity to check his grasp of the material he is learning, the student is called upon throughout the unit to construct definitions, label components, answer questions, and solve problems. To achieve these objects the kit preferably includes work sheets that restate the question or problem and provide working space and answer blanks. The work sheets are preferably laminated so that the student can easily erase an answer and redo a problem with the added advantage that the sheets can be cleaned off for use by another student. The work sheets are also beneficial in telling the instructor about a student's work habits and whether or not he is benefiting from the kit. In addition, an instructor's review of the work sheets can help him locate the point at which the student is having difficulty.

All of the above materials can be conveniently housed in a compartment-like case for easy use and storage. Thus, the educational kit which includes the simulator board 10, the display board 20, the manipulative pieces as shown in FIG. 3, the instructional means, such as video slides or tapes, the audio cassettes, and the work sheets, can all be contained within one case. The kit may also include sample tests or quizzes which can be given by the instructor before and after use of the program and an instuctor's manual.

An example of how a preferred embodiment of an educational kit in accordance with the present invention may be used to teach the functioning of an oscilloscope is as follows: The audiovisual presentation begins with a general description of an oscilloscope, including such items as for example, how it operates to function as a kind of metering device. The student is introduced by the audiovisual presentation to the cathode-ray tube, the operation of which is explained in detail. For example, the instructional material discusses how the adjustable voltages control is connected to horizontal and vertical plates contained within the cathode-ray tube to allow for the positioning of a beam which is projected onto the tube screen. The student is also taught that by adjusting the voltage on the plates, the beam may be positioned anywhere on the screen. Numerous examples are given. For example, with the adjustable voltages control set so that there are negative 20 volts on the right horizontal plate and positive ten volts on the lower vertical plate, the beam will be pushed to the far left by the negative 20 volts and pulled down half that distance by the positive 10 volts. If one wanted to place the beam at the upper right-hand corner of the screen, then one would need to attract the beam to the right with positive 20 volts on the horizontal plate and repel the beam upward with negative 20 volts. During the audiovisual presentation the student may be asked to copy certain definitions and descriptions on his work sheets. Also, the student is referred to his work sheets to solve various problems such as for example, where a beam might appear on an oscilloscope screen knowing the charge and flash or voltage on the horizontal and vertical plates. The discussion continues to describe how the beam of light projected onto the cathode-ray tube screen moves on the screen, and how the beam of light can be controlled, i.e., by using a series of plates around the screen having positive and negative charges placed thereon. The instructional material is presented to the student by means of visual slides and a synchronized audio presentation.

Figure 5:
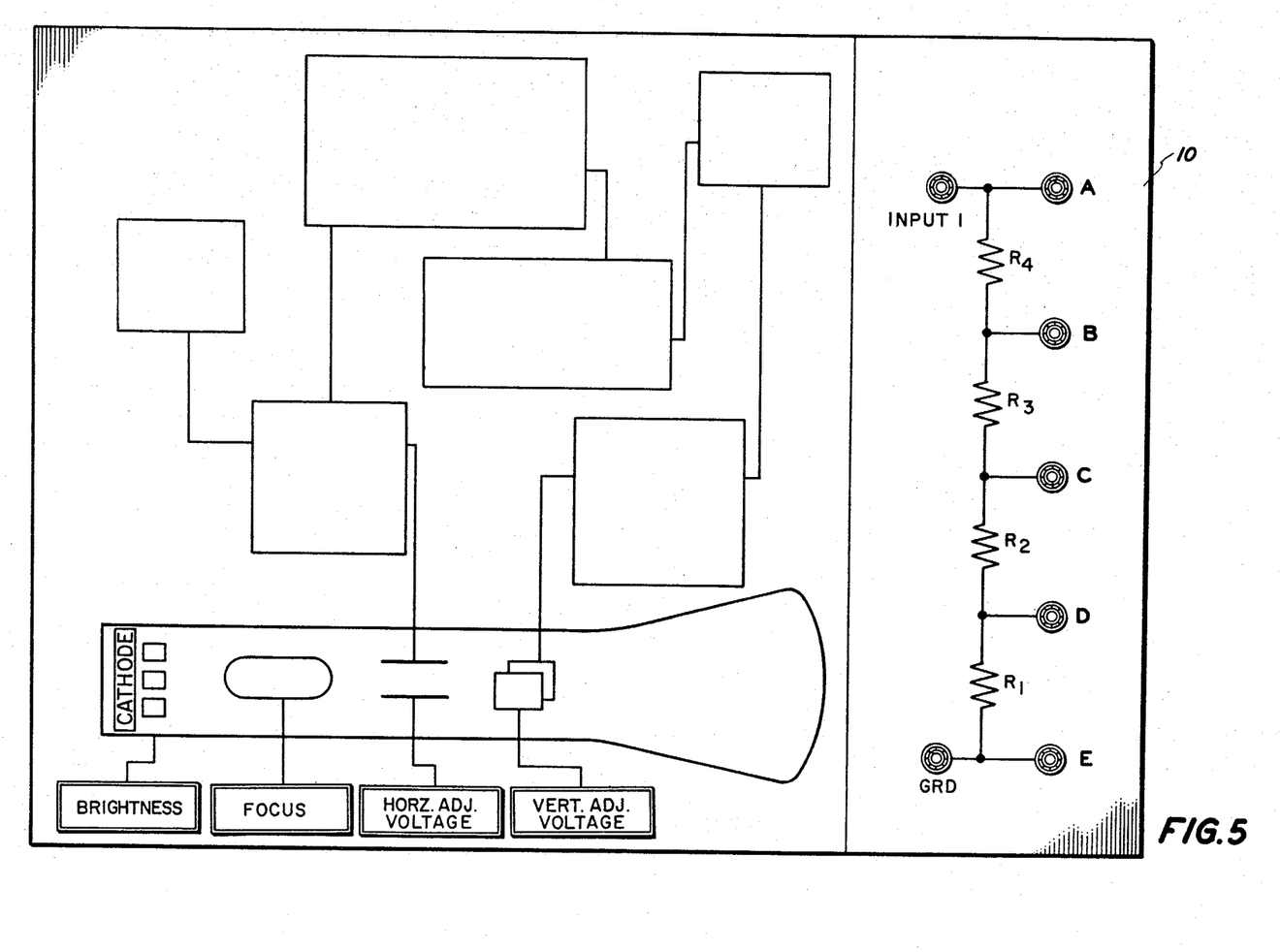
FIG. 5 is a plan view of the simulator board shown in FIG. 1 with certain of the manipulative pieces as shown in FIG. 3 in place on the board.

At certain points during the presentation, the student is asked to turn to the simulator board and accessories to define for himself concepts which either have been taught or are being taught to him simultaneously with the instructional material, and to actually operate an oscilloscope. For example, using the cathode-ray tube which is illustrated on the left-hand side of the simulator board, the student selects certain of the manipulative pieces and places them at the appropriate locations on the board. For example, the instructional means discusses the concepts of brightness, focusing apparatus, horizontal adjusting voltage, and vertical adjusting voltage as they refer to a cathode-ray tube in an oscilloscope. The student identifies these terms with the various parts of the cathode-ray tube graphically shown on the board by placing the manipulative pieces illustrated in FIGS. 3H, 3I, 3K and 3L on the simulator board in the proper spaces as shown in FIG. 5. At the same time slides show the student pictures of various oscilloscopes and indicates the exact controls which are used for adjusting these particular features. The instructional material continues with a discussion of the various types of controls found on various oscilloscopes explaining to the student how these controls are operated and how they affect the functioning of the oscilloscope.

Figure 6:
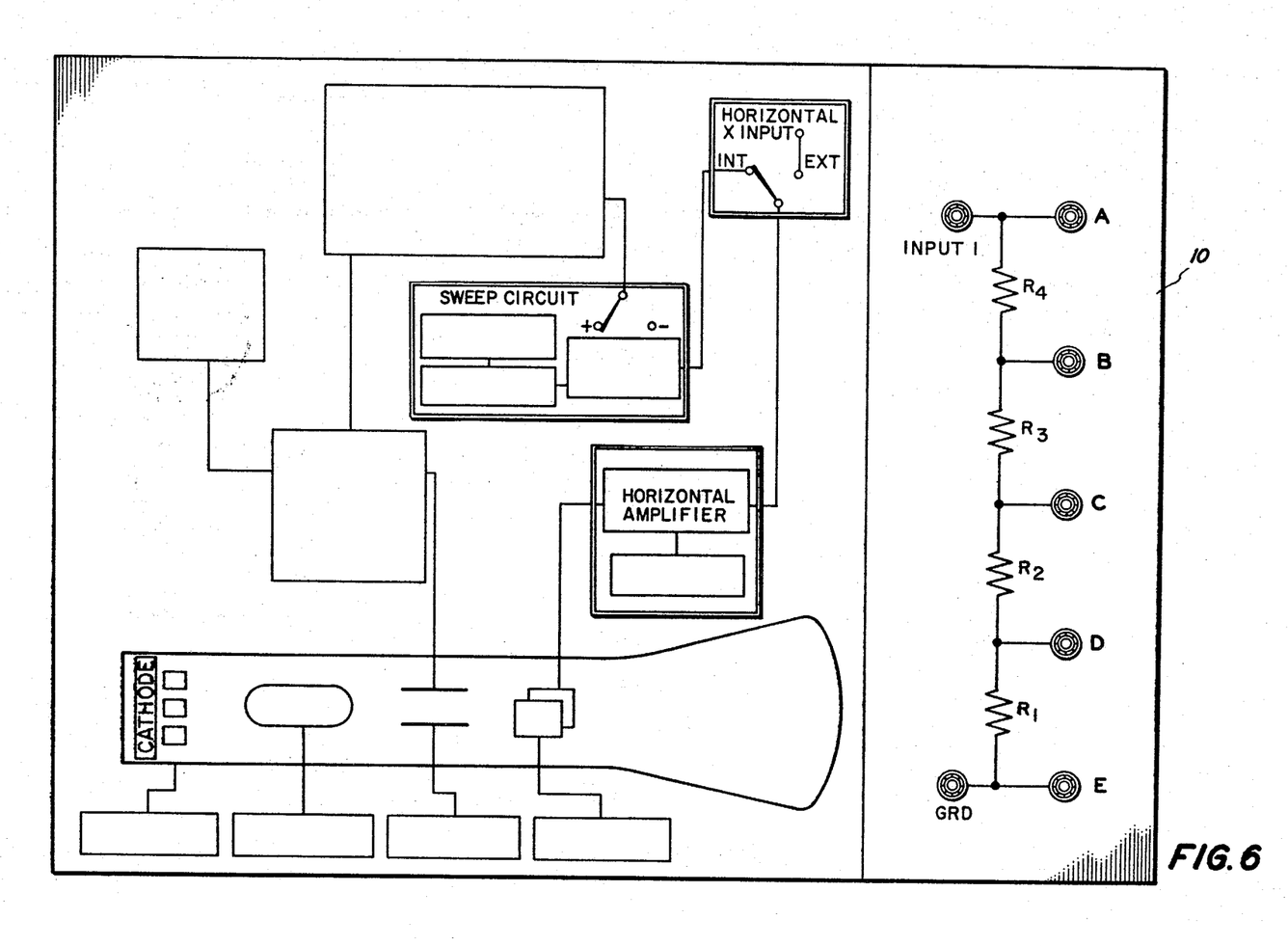
FIG. 6 is a second plan view of the simulator board shown in FIG. 1 with certain of the manipulative pieces shown in FIG. 3 in place on the board.
Figure 7:
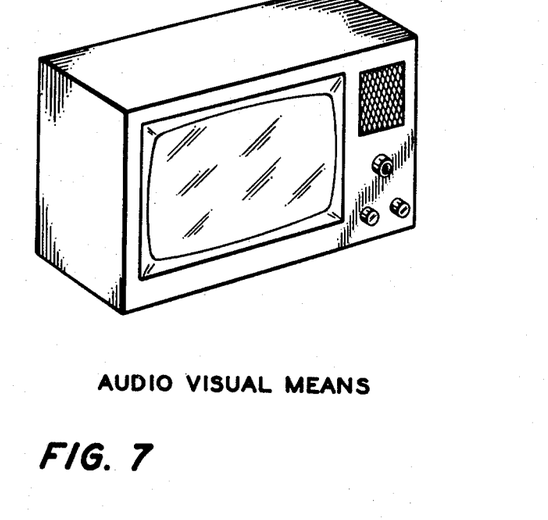
FIG. 7 illustrates generally an audiovisual device suitable for use in the present invention.
Figure 8:
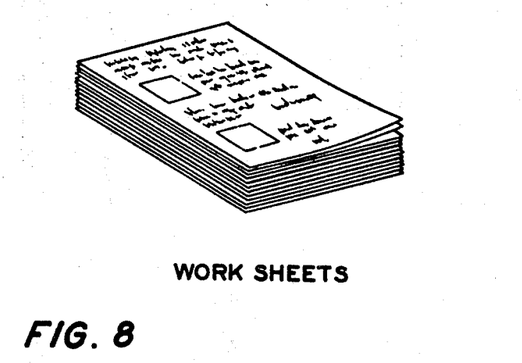
FIG. 8 illustrates generally worksheets in accordance with the present invention.
Figure 9:
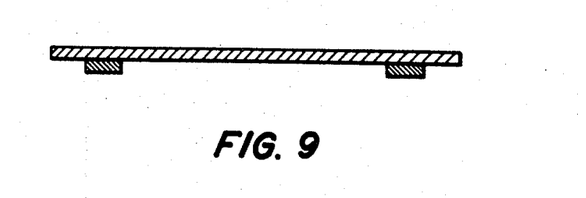
FIG. 9 is a side sectioned view of a typical manipulative piece in accordance with the invention showing smaller magnetic sections laminated to the underside of the piece.

The instructional material then focuses on how to view A.C. voltage and take basic measurements of A.C. voltages and frequencies using an oscilloscope. In this regard the student is introduced to the various types of circuits found in an oscilloscope, e.g., a synchronizing circuit, a sweep circuit, etc., and uses the left side of the simulator board to study these circuits. For example, the student is asked to construct on the simulator board the basic sweep circuit found in most oscilloscopes. This is done in the manner as shown in FIG. 6. In referring to the circuit constructed on the simulator board by the student, the instructional material precedes to explain the sweep circuit as one which generates a sawtooth voltage which is connected through the horizontal input to the horizontal amplifier, and from there to the horizontal plates of the cathode-ray tube. While listening to the audio portion of the instruction means the student can also examine the circuit that he has constructed on the simulator board. To circuits constructed on the board, additional circuits can be added. For example, the manipulative piece representing the synchronizing circuit (FIG. 3A) can be placed on the board in the proper location to represent the addition of the synchronizing circuit to the sweep circuit. Also, portions of the circuits shown on some of the manipulative pieces are subject to further identification (note the blank boxes in FIGS. 3A, 3B, 3C and 3D). For example, various portions of the sweep circuit are identified by placing the manipulative piece representing the sweep generator (FIG. 3M) on the empty box on the right side of the sweep circuit piece (FIG. 3C), and the sweep vernier and sweep selector pieces (FIGS. 3N and 3Q) in the remaining two empty boxes on the sweep circuit manipulative piece. The instructional means precedes to introduce the student to numerous other portions of the oscilloscope. For example, the student is introduced to concepts such as horizontal frequency range, sweep vernier, horizontal frequency, half-way position, internal sweep, etc. At the same time that the student is introduced to these concepts, he also operates an oscilloscope according to the procedure defined for him by the audiovisual instruction means.

Thereafter, the student is introduced to a signal generator and its function. By actually using a signal generator with an oscilloscope the student is taught how to connect a signal generator to an oscilloscope to obtain and adjust a display on the screen. This discussion next focuses on instructing the student how to measure a variety of voltages. For example, after setting the oscilloscope to measure input voltage, the student is told to use his signal generator to produce a voltage of 4 volts peak to peak. Thus, for example, the student is told to first plug the signal generator into a wall socket, turn it on, and to set the signal generator to 60 cycles. He is then told to take the output jacks from the signal generator and connect them to the vertical input jacks of the oscilloscope. Using an Eico 460 oscilloscope, he is told to turn the vertical attenuator, or vertical selector switch, from the calibrate or C-A-L position to the one or times one position and then adjust output gain or output amplitude from the signal generator until the trace on the oscilloscope screen fills 20 sections of the Y axis. The distance between each segment equals point two volts. To find the amplitude of the trace, the student is told that one multiplies 0.2 × 20 which equals four volts peak to peak. As this instructional material is presented to the student on the audio means, he is also shown how to perform each step on the visual slides.

The student is then referred to the right-hand portion of the simulator board where he is told to use his oscilloscope to measure, for example, four voltage drops across each of the four resistors, $R_1$, $R_2$, $R_3$ and $R_4$, on the board. The instructional means tells the student to connect the black jack lead from the ground terminal post 16 on the simulator to the ground on the oscilloscope and to connect the red jack lead from the simulator, terminal post 14-point D, to the oscilloscope in the vertical input jack. By doing this the student is informed that he has connected the voltage across $R_1$ on the simulator to the vertical input circuit of the oscilloscope and that he can now measure the amplitude of this voltage. In a similar manner the instructional material continues to instruct the student how to use the signal generator, oscilloscope and right-hand portion of the simulator board to calculate the voltage drop across each of the other resistors depicted on the simulator board. Throughout the entire audiovisual presentation the student is referred to the work sheets to either record information, make calculations, or answer questions. The above-described educational unit is programmed such that the student will encounter a minimum of frustration and a maximum of learning efficiency during use of the kit.

After using the educational kit in accordance with the present invention the student will have an understanding of how an oscilloscope functions and will be able to define or describe in one sentence or less terms such as persistance of vision, cathode-ray tube, electron gun, graticule, vertical plate, horizontal plate, cathode, X-axis, horizontal amplifier, vertical amplifier, sweep generator, horizontal input, synchronizing circuit, trigger amplifier, vertical input, sawtooth oscillator, and signal generator; describe in one sentence or less the functions of the various controls on an oscilloscope such as on-off (power), brightness (intensity), focus, V-positive, H-positive, vertical gain, horizontal gain, sweep selector, sweep vernier and synch selector; list the major circuits or circuit functions for producing a focused point of light on the screen of a cathode-ray tube, and positioning that point of light anywhere on the screen; list the major circuits or circuit functions for producing a horizontal trace on a cathode-ray tube screen that moves at a linear rate from left to right; list the major circuits or circuit functions for displaying an A.C. voltage on a cathode-ray tube screen including synchronizing the display; list the two axes used for positioning a point of light on a cathode-ray tube screen, and explain how movement along these two axes will allow positioning the beam anywhere on the screen; locate the controls of an oscilloscope and use them to perform tasks such as obtaining a focused beam of light on the screen and positioning it anywhere on the face of the screen, and setting up a horizontal trace or sweep and vertical amplifier controls with the necessary synchronizing signal so that two to four cycles of a 60 horizontal or a 120 horizontal sine wave signal may be viewed on the screen; measure the amplitude of a sixty horizontal sine wave, using either an internally callibrated signal or a signal generator and a VTVM as a reference voltage; measure a D.C. voltage by calibrating an oscilloscope with a graticule so that each division on the graticule represents a specific amount of D.C. voltage, and then use the amount of deflection due to an unknown D.C. voltage to measure the amount of that voltage; and describe the purpose and basic operation of an oscilloscope.

Details of the various methods by which students can use the educational kit of this invention are explained in detail in "Occupational Technology Series, Electronics Technology, Oscilloscope, Unit 11119-81" published by the Xerox Corporation.

I claim:

1. An educational kit for teaching the basic principles about the functioning of an oscilloscope utilizing an oscilloscope and structure comprising in combination:

a. a simulator board having a surface of magnetically attractive material and having (i) on a first area of said board graphic indicia on the surface thereof defining a sectional view of a cathode ray tube and indicia defining a plurality of areas surrounding said cathode ray tube, said areas being used by the user of said kit to graphically depict the mechanisms which control the operation of a cathode ray tube and circuits found within an oscilloscope effecting said control mechanisms whereby the user of said kit can obtain an understanding of the theory behind the functioning of an oscilloscope; (ii) on a second area of said board graphic indicia defining a voltage divided circuit including a plurality of resistors in series, a ground terminal and an input terminal; a plurality of terminal posts affixed to the upper portion of said board within said circuit, said posts positioned at the ground terminal, the input terminal and by each of the resistors such that each resistor lies between two terminal posts; and a plurality of resistors secured to the bottom portion of the board in the same circuit arrangement that is graphically depicted on the top portion of said board and means to provide a voltage to said input and ground terminals; whereby the user of said kit can learn to use an oscilloscope after obtaining an understanding of the theory of oscilloscopes by securing said voltage means to said circuit and measuring voltage drops with an oscilloscope across said resistors:

b. a plurality of magnetically attractive manipulative pieces each bearing individually on their surfaces graphic indicia defining items found within an oscilloscope, said pieces comprising (i) a plurality of pieces each containing indicia defining control mechanisms found within an oscilloscope and each adapted for positioning within said plurality of areas; and (ii) a plurality of pieces each containing indicia defining various circuit diagrams for said control mechanisms, each adapted for positioning within said plurality of areas, said manipulative pieces adapted for manipulation within the confines of the first area of said board in sequence within said plurality of areas whereby mechanisms controlling a cathode ray tube and circuits found within an oscilloscope can be graphically depicted, said magnetically attractive board or alternatively each of said magnetically attractive pieces being magnetic to provide a mutual attraction between said board and said pieces;

c. a display board for said manipulative pieces including a sheet of magnetically attractive material, said display board having graphic indicia on a surface thereof in spaced relationship, said graphic indicia corresponding to the indicia present on each of said manipulative pieces, said manipulative pieces adapted for storage on and removal from said display board; and d. audiovisual instructional means for presenting information relevant to the basic principles about the functioning of an oscilloscope including information defining (i) the first and second areas of said board, (ii) the indicia on said pieces, (iii) the indicia on said board, (iv) the relationship of the indicia on the first area of said board to the indicia on said pieces and use of the second area of said board with an oscilloscope whereby the basic principles about an oscilloscope can be learned by the user by using said board in response to said instructional means.

2. An educational kit according to claim 1 wherein said audiovisual instructional means includes visual and audio instructional portions terminating in audio directions to the user of the kit to perform a manipulative activity using said first and second areas of the simulator board and said manipulative pieces, said instructional means stopping upon completion of said audio directions and being restartable by the kit user upon completion of said manipulative activity.

3. An educational kit according to claim 1 wherein said manipulative pieces are magnetic.

4. An educational kit according to claim 3 wherein said manipulative pieces include a substantially flat sheet of a substantially rigid material having a smaller section of a magnetic material laminated thereto.

5. An educational kit according to claim 1 wherein said audio instruction means includes tape recordings which are synchronized with said visual instruction means which includes slides or film strips.

6. An educational kit according to claim 1 wherein said instruction means includes a plurality of student work sheets, said work sheets being adapted for use by the student to record information and test the student in response to said audiovisual instruction means.

7. An educational kit according to claim 1 wherein said simulator board, said manipulative pieces, and said display board are constructed of a substantially rigid material.

* * * * *